Dec. 21, 1943.  S. R. SMITH, JR., ET AL  2,337,353
PROTECTIVE DEVICE
Filed Dec. 26, 1941

Inventor:
Sidney R. Smith Jr.,
Charles R. Craig,
by Harry E. Dunham
His Attorney.

Patented Dec. 21, 1943

2,337,353

UNITED STATES PATENT OFFICE 2,337,353

PROTECTIVE DEVICE

Sidney R. Smith, Jr. and Charles R. Craig, Pittsfield, Mass., assignors to General Electric Company, a corporation of New York Application December 26, 1941, Serial No. 424,430

8 Claims. (Cl. 200—127)

Our invention relates to a protective device and more particularly to a fused protective device for protecting electrical apparatus, such as transformers and the like, which may be of the liquid insulation filled type.

It is an object of our invention to provide a new and improved fused protective device for electrical apparatus capable of being mounted within a bushing of such apparatus.

It is another object of our invention to provide a new and improved fused device and mounting therefor.

Further objects and advantages of our invention will become apparent as the following description proceeds and the features of novelty which characterize our invention will be pointed out with particularity in the claims annexed to and forming a part of this specification.

Figure 1:
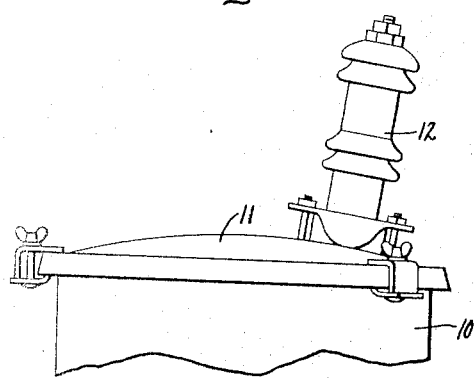
Figure 2:
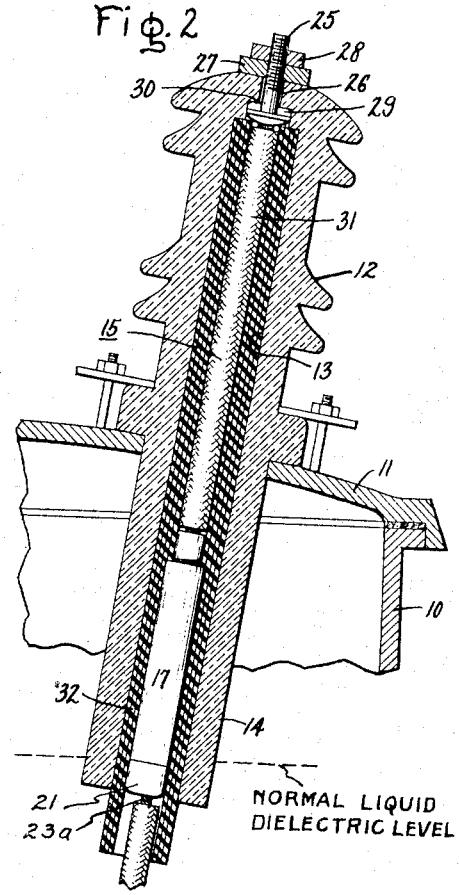
Figure 3:
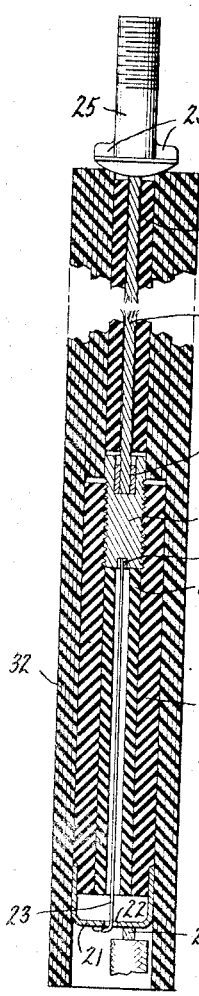
Figure 4:
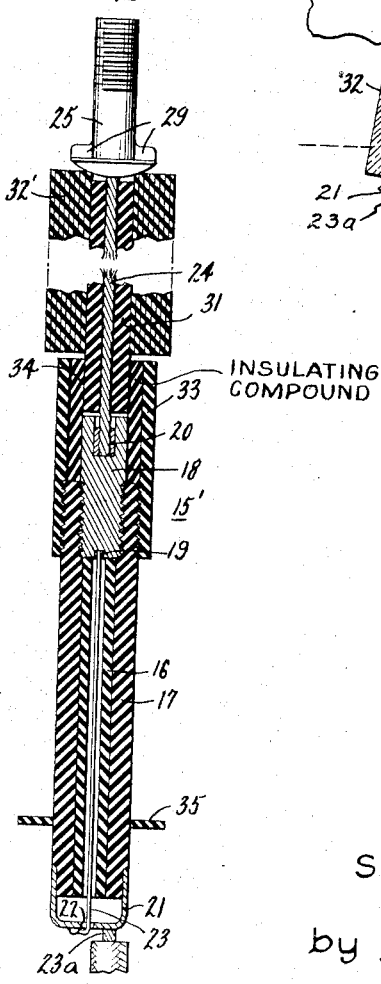

For a better understanding of our invention, reference may be had to the accompanying drawing in which Fig. 1 is a partial view of one application of our invention to an electrical apparatus, such as a transformer, Fig. 2 is an enlarged sectional view of the bushing of the transformer of Fig. 1 illustrating an application of the fused protective device of our invention, Fig. 3 is a sectional view of the fused protective device of Fig. 2, and Fig. 4 is a view similar to Fig. 3 of a modification of our invention.

Although our invention may be employed in the protection of forms of electrical apparatus other than transformers, we have elected for the purpose of describing and illustrating our invention to show it as applied to the protection of an electric translating apparatus, such as a transformer.

In Figs. 1 and 2 of the drawing, 10 designates the casing of an electric translating apparatus, such as a transformer, which may contain the usual windings and insulating liquid dielectric. Casing 10 may be provided with a cover 11 suitably fastened thereto. Supported on cover 11 and extending from the top thereof is at least one insulated high-voltage bushing 12 through which electrical connections with the high-voltage windings of the transformer may be made. The bushing 12 includes a hollow central portion or chamber 13 through which the high-voltage lead extends so that connections may be made with an external electrical circuit. The bushing 12 is preferably constructed of a ceramic insulating material and includes a depending portion 14 which extends for some distance beneath the cover 11 of casing 10.

The chamber 13 of bushing 12 generally accommodates an insulated lead. However, since distribution transformers often require fused protective devices, we have provided a fused protective device generally indicated at 15 for insertion in the hollow central portion or chamber 13 of the bushing 12 in place of the insulated lead. Fuses have been used inside hollow bushings heretofore but difficulties in regard to corona, radio interference, and improper operation on both high and low fault currents have been encountered. Furthermore, difficulties have also been encountered in constructing a fuse device small enough so as not to extend substantially below the depending portion 14 of bushing 12.

We have discovered in constructing a fuse capable of being mounted within the hollow central portion of a bushing without substantially extending below the lower portion thereof that, by greatly decreasing the bore of the fuse tube as well as greatly reducing the length of this bore, a marked increase in efficiency is obtained. By using a very small bore, efficient interrupting operation is obtained on low currents as well as on high currents and, furthermore, by greatly reducing the length of the fuse tube having the small bore, a marked improvement in the ability of the fuse tube to vent the gases produced and thus avoid high tube pressure is obtained. We have discovered that it is desirable for the fuse tube to have a bore of ⅛ of an inch or less. In terms of this bore, the length of the fuse tube and, consequently, the length of the fuse should satisfy the following equation:

$$L = \frac{Vd}{K}$$

where L is the length in inches of the fuse tube or that portion of the fuse tube having the small bore, V is the operating voltage of the fuse device, d is the bore diameter in inches, and K is a constant which falls within the range of value between 200 and 400. With a fuse tube having such dimensions, we have found that a very marked increase in efficiency under all operating conditions is obtained.

In order to obtain satisfactory expulsion action, it is desirable that the inner surface of the fuse tube be constructed of a gas-evolving insulating material such as fiber. However, it is mechanically difficult to construct a fiber tube having a fairly large outside diameter which has a bore ⅛ of an inch or less and, accordingly, in Fig. 3, we have illustrated a fiber tube 16 having a small bore of ⅛ of an inch or less and a length which satisfies the equation set forth above constructed of gas-evolving insulating material or the like. This tube of small bore is preferably mounted within a larger tube 17 which may also be constructed of fiber or any other suitable insulating material and of a size to insure a tight fit between insulating tubes 16 and 17. The outside surface of tube 16 is preferably knurled, whereby variations in the outside diameter of small bore tube 16 and the inside diameter of tube 17 may readily be absorbed to provide a tight press fit so that tubes 16 and 17 form substantially an integral structure. It should be understood, of course, that the fuse tube comprising portions 16 and 17 may be constructed of a single member if mechanically feasible.

As shown in Fig. 3, the upper end of outer tube 17 is preferably threaded to receive a threaded upper fuse terminal 18 including a fuse-receiving recess 19 and a flexible cable-receiving recess 20. The lower terminal of the fuse tube comprising members 16 and 17 is illustrated as comprising a cup-shaped conducting member 21 suitably fastened to the lower end of the fuse tube and having an opening 22 therein which is sufficiently large to permit passage therethrough of the fuse wire 23 which may have one end thereof soldered into fuse-receiving recess 19 of terminal 18 while the other end thereof is soldered to the exterior of lower cup-shaped terminal 21. The opening 22 also permits gases to escape therethrough and, under severe fault conditions, cap 21 may be blown completely away from the fuse tube comprising members 16 and 17.

Lower fuse terminal 21 may be suitably connected to the transformer windings as by insulated conductor 23a. A suitable flexible cable 24 is preferably fastened to terminal 18 as by being soldered into cable-receiving recess 20 and is electrically connected to a bolt 25 which is adapted to extend through a small opening 26 in the upper part of bushing 12 with which electrical connections may be made as by nuts 27 and 28. Bolt 25 is preferably provided with a pair of lugs 29 for engaging with cooperating notches 30 formed in bushing 12 to prevent turning of bolt 25 while nuts 27 and 28 are tightened thereon. Flexible cable 24 is preferably covered with insulation 31 as shown in Figs. 2 and 3.

In order to minimize both radio interference in the range of transformer voltage rating and corona discharge when the fuse device is subjected to high-voltage impulses, we have provided a wrapping of absorbent insulating material 32, such as crepe paper or the like, for the entire fuse tube and flexible lead as shown in Figs. 2 and 3 so that, when the lower portion of the fuse tube is exposed to an insulating liquid dielectric, such as oil, the entire space 13 within the bushing 12 is in effect surrounded by such liquid dielectric due to capillary action even though the main body of the fuse device is located above the liquid dielectric level in the electric translating apparatus such as the transformer. As shown in Fig. 2, preferably the crepe paper wrapping 32 extends somewhat below the depending portion 14 of the bushing to insure that it is partly immersed in the liquid dielectric even if the dielectric level should fall somewhat and also better to insulate the metal parts at the lower end of the fuse device. This arrangement was found to be especially effective in reducing corona discharge and radio interference since the liquid dielectric soaked crepe paper substantially eliminated all air in this space.

Another important feature of the crepe-paper wrapping is the fact that it completely fills the space within the bushing and, consequently, prevents reflected gases upon current interruption, such as may be expelled from the fuse tube upon operation thereof, from going up around the outside of the fuse tube to cause flashover. As may be observed from Fig. 2, the small diameter fuse wire 23 is positioned a considerable distance below cover 11 of casing 10 to eliminate high-voltage stress and, consequently, greatly to reduce radio interference. The flexible lead 24 has a larger diameter and is surrounded by considerable high-voltage insulation so that the high-voltage gradients or stresses from the lead to the edge of the hole in cover 11 are controlled so as to minimize impulse corona and radio interference.

In Fig. 4, we have shown a modification of the fuse device of our invention which is generally designated as 15' while the corresponding parts thereof are designated by the same reference numerals as the fuse device of Fig. 3. Instead of providing a crepe-paper wrapping for the entire fuse as in Fig. 3, we provide a suitable tube or ferrule 33 of insulating material which may be threadedly mounted to the upper portion of the outer tube 17 so as to surround completely the upper terminal 18. Preferably, this tube is constructed so as to provide a space surrounding the fuse terminal 18 which may be filled with a suitable insulating compound 34 as indicated, not only to aid in reducing radio interference but also to protect the upper fuse terminal 18 against arc-over of the fuse tube due to reflected gases upon current interruption. It should be understood that, even without the insulating compound 34, the insulating ferrule 33 will minimize the probability of such arc-over.

The lower portion of the fuse tube comprising members 16 and 17 is preferably provided with a fiber washer 35 to space the fuse tube within the hollow central portion of bushing 12 and also to prevent gases from entering this space. The upper portion of the fuse device may be provided with a crepe-paper wrapping 32' similar to the wrapping illustrated in Fig. 3.

With the above-described arrangements, we have provided a bushing fuse requiring less space than similar devices heretofore which operates very satisfactorily on low currents as well as high currents due to the particular proportioning of the fuse tube bore and the length thereof and, furthermore, which greatly minimizes radio interference and corona discharges when subjected to high-voltage impulses.

While we have shown and described our invention in connection with certain specific embodiments, it should be understood that our invention is not limited to the specific details herein illustrated and that changes and modifications may occur to one skilled in the art without departing from the spirit and scope of our invention as set forth in the appended claims.

What we claim as new and desire to secure by Letters Patent of the United States is:

1. An expulsion fuse device for electric apparatus of the type using an insulating dielectric and including a high-voltage bushing comprising a fuse tube of insulating material having a bore of 1/8 inch or less, a fusible element positioned in said fuse tube, said fuse tube bore having a length in inches equal to the ratio of the product of the operating volts and the bore in inches to a constant having a value between 200 and 400, and means for positioning said fuse tube in said bushing.

2. A bushing fuse for electrical apparatus of the type having a high-voltage bushing, comprising a fuse tube of insulating material having a bore of ⅛ inch or less, said bore having a length in inches equal to $Vd/K$, where V is the operating voltage of the fuse device, $d$ is the bore in inches, and K is a constant having a value falling within the range between 200 and 400, a fusible element positioned in said fuse tube, and means for supporting said fuse tube within said bushing.

3. An expulsion fuse device for electric apparatus of the type employing an insulating liquid dielectric and including a high-voltage bushing comprising a fuse tube of insulating material, a fusible element positioned in said tube, means for positioning said fuse tube so as to be completely housed within said bushing, and means for minimizing radio interference at operating voltages and corona discharge when said fuse device is subjected to high-voltage impulses comprising a wrapping of absorbent insulating material capable of becoming saturated with said liquid dielectric so as effectively to surround the main portion of said fuse device with said liquid dielectric even though the main body of said device is located above the level of the liquid dielectric in said apparatus.

4. An expulsion fuse device for electric apparatus of the type including a high-voltage bushing comprising a fuse tube of insulating material, a terminal associated with each end of said fuse tube, a fusible element positioned in said tube and interconnecting said terminals, an insulating ferrule surrounding one of said terminals and adapted to be filled with an insulating compound so as to exclude air from around said terminal to minimize radio interference, and means for positioning said fuse tube substantially within said high-voltage bushing.

5. In an expulsion fuse, the combination of a fuse tube of insulating material having a bore of ⅛ inch or less, a pair of terminals associated with said fuse tube, and a fusible element positioned in said fuse tube interconnecting said terminals, said fuse tube having a length in inches equal to the product of the operating volts and the bore in inches divided by a constant having a value falling within the range between 200 and 400.

6. An expulsion fuse device for electric apparatus of the type employing an insulating liquid dielectric and including a high-voltage bushing comprising a fuse tube of insulating material having a bore of ⅛ inch or less, a fusible element positioned in said tube, means for positioning said fuse tube so as to be completely housed within said bushing, and means for minimizing radio interference at operating voltages and corona discharge when said fuse device is subjected to high-voltage impulses comprising a wrapping of absorbent insulating material capable of becoming saturated with said liquid dielectric so as effectively to surround the main portion of said fuse device with said liquid dielectric even though the main body of said device is located above the level of the liquid dielectric in said apparatus.

7. An expulsion fuse device for electric apparatus of the type employing an insulating liquid dielectric and including a high-voltage bushing comprising a fuse tube of insulating material having a bore of ⅛ inch or less and a length in inches equal to the ratio of the product of the operating volts and the bore and a constant having a value falling within the range between 200 and 400, a fusible element positioned in said tube, means for positioning said fuse tube so as to be completely housed within said bushing, and means for minimizing radio interference at operating voltages and corona discharge when said fuse device is subjected to high-voltage impulses comprising a wrapping of absorbent insulating material capable of becoming saturated with said liquid dielectric so as effectively to surround the main portion of said fuse device with said liquid dielectric even though the main body of said device is located above the level of the liquid dielectric in said apparatus.

8. An expulsion fuse device for electric apparatus of the type employing an insulating liquid dielectric and including a high-voltage bushing comprising a fuse tube of insulating material, a fusible element positioned in said tube, means for positioning said fuse tube so as to be completely housed within said bushing, and means for minimizing radio interference at operating voltages and corona discharge when said fuse device is subjected to high-voltage impulses comprising a crepe-paper wrapping capable of becoming saturated with said liquid dielectric so as effectively to surround the main portion of said fuse device with said liquid dielectric even though the main body of said device is located above the level of the liquid dielectric in said apparatus.

SIDNEY R. SMITH, Jr.
CHARLES R. CRAIG.